INVENTOR.
DONALD H. HAGEN
BY Williamson, Palmatier
& Bains ATTORNEYS

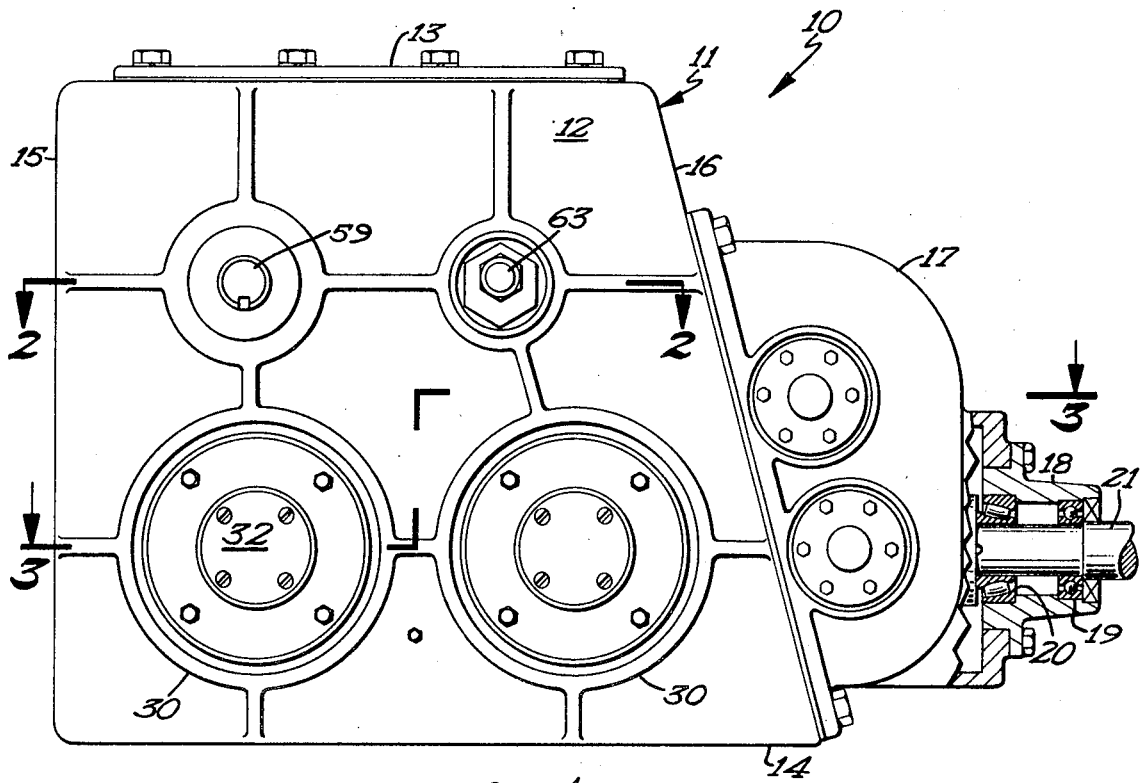

INVENTOR.
DONALD H. HAGEN
BY Williamson, Palmatier
& Bains
ATTORNEYS

INVENTOR.
DONALD H. HAGEN

BY Williamson, Palmatier
& Bains ATTORNEYS

United States Patent Office 3,515,014
Patented June 2, 1970

1

3,515,014
TRANSMISSION SYSTEM
Donald H. Hagen, Brooklyn Center, Minn. 55429
Continuation-in-part of application Ser. No. 698,570,
Jan. 17, 1968. This application July 18, 1969, Ser.
No. 843,168
Int. Cl. F16h 3/08, 37/06
U.S. Cl. 74—665                                6 Claims

ABSTRACT OF THE DISCLOSURE

A transmission device includes a compact housing which has a pair of shafts journaled therein each having a gear keyed thereto for rotation therewith. The gears are disposed in meshing relation with respect to each other, and an input shaft is drivingly connected with the gears so that the gears are continuously revolved. A pair of output shafts are provided and each output shaft is selectively maintained in a non-drive condition, or drive in a forward or reverse direction from the gears by suitable clutches. The clutches are shiftable into and out of engaging relation with the associated gears by hydraulic arms.

---

This is a continuation-in-part application of my co-pending application, Ser. No. 698,570, filed Jan. 17, 1968, now Pat. No. 3,457,805 and entitled "Transmission Mechanism."

SUMMARY OF THE INVENTION

An object of this invention is to provide a novel transmission system in which all of the components thereof are contained within a compact housing which contains a predetermined amount of lubricant so that the transmission system occupies only a minimum of space.

Another object of this invention is to provide a transmission system contained within a single housing and including an input drive connection with a source of power and including a pair of output shafts which are connectable to driven structures such as ground engaging wheels and the like, the transmission system also including a pair of continuously driven enmeshing gears each provided with a pair of hydraulically operated clutches for positively and effectively interengaging the gears with the output shafts and thereby permit each output shaft to be selectively driven in either a forward or reverse direction.

BRIEF DESCRIPTION OF THE FIGURES OF THE DRAWING

FIG. 1 is a side-elevational view of one embodiment of the novel transmission device with certain parts thereof broken away for clarity, FIG. 2 is a cross-sectional view taken approximately along line 2—2 of FIG. 1 and looking in the direction of the arrows.

2

DETAILED DESCRIPTION OF THE INVENTION

Figure 3:
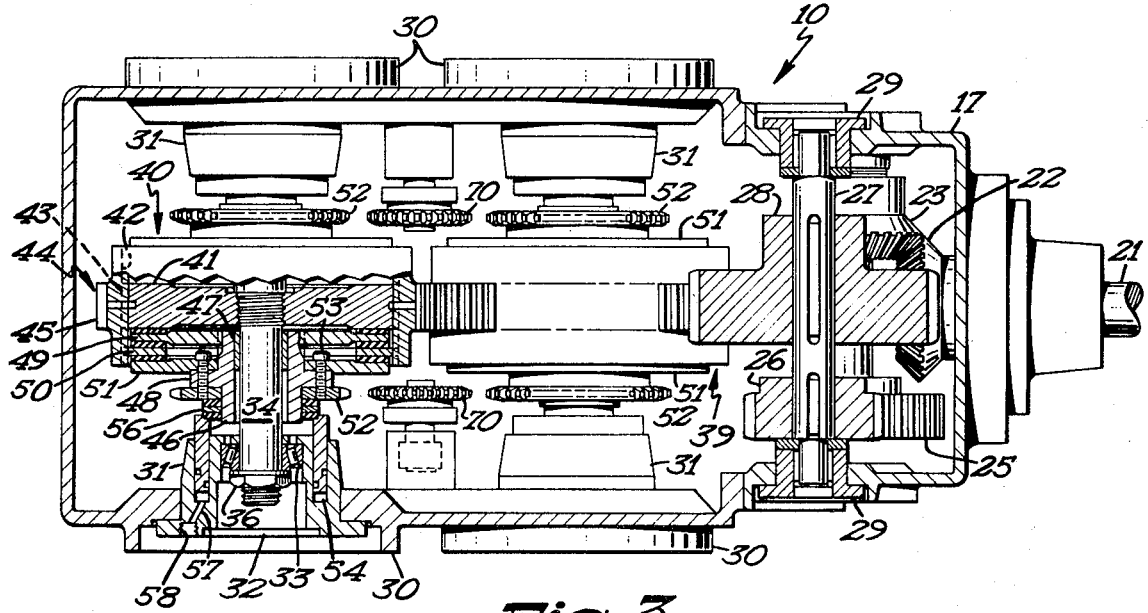
FIG. 3 is a cross-sectional view taken approximately along line 3—3 and looking in the direction of the arrows.

Referring now to the drawings and more specifically to FIGS. 1 to 4, it will be seen that one embodiment of the transmission device, designated generally by the reference numeral 10 is thereshown. The various components of the transmission device are mounted within a housing 11 which is of generally rectangular configuration and is comprised of side plates 12, top plate 13, bottom plate 14, rear plate 15, and a front plate 16. The top plate 16 is removable to permit access to the interior of the housing.

In the embodiment shown, the front plate 16 has a large opening therein and an auxiliary housing 17 is secured to the front plate, as best seen in FIGS. 1 and 3. This auxiliary housing 17 also has its rear end open and the opening therein is disposed in registering relation with the opening in the front plate.

The auxiliary housing 17 has a generally cylindrically shaped bearing housing 18 secured thereto by suitable bolts and this bearing housing has a ball bearing assembly 19 and a roller bearing assembly 20 disposed therein to journal one end of an input shaft 21. This input shaft 21 is connected to the power plant or engine which may be located remotely from the transmission device 10. This shaft 21 projects rearwardly into the housing 17 and has a bevel gear 22 keyed to the end thereof for rotation therewith.

A bevel gear 22 is disposed in meshing relation with a bevel gear 23 which is keyed to a shaft 24 whose axis is disposed substantially normal to the axis of rotation of the shaft 21. Shaft 24 has a circular gear 25 keyed or otherwise affixed thereto for rotation therewith and gear 25 is disposed in meshing relation with a small circular gear 26 which is keyed to a shaft 27. It will be noted that shaft 27 is disposed in substantially parallel relation with respect to shaft 24 and has a circular gear 28 keyed thereto for rotation therewith. It will further be noted that the ends of shaft 27 are journaled in suitable bearing housings 29 carried by the auxiliary housing 17. It is also pointed out that the end portions of shaft 24 are also journaled in suitable bearings carried by the auxiliary housing 17.

Referring again to FIGS. 1 and 3, it will be seen that the side plates 12 are each provided with a pair of outwardly projecting generally cylindrical shaped hollow bosses 30 each communicating with the interior of the housing 11. Each of the hollow bosses 30 has a flanged generally cylindrical shaped bearing housing 31 positioned interiorly thereof and projecting inwardly of the housing 11. Each bearing housing 31 is closed with respect to the exterior by suitable closure cover 32 which is secured to the bearing housing 31 by suitable bolts or the like. Each bearing housing 31 accommodates a roller bearing assembly 33 therein.

Opposite end portions of a shaft 34 are journaled in an axially aligned pair of roller bearing assemblies 33 while opposite end portions of a shaft 35 are journaled in the other axially aligned pair of roller bearing assemblies. Each of the shafts 34 and 35 have opposite ends thereof threaded for accommodating a retaining nut 36 for preventing axial movement of each shaft. A gear structure 39 is mounted on the shaft 34 while the gear structure 40 is mounted on shaft 35. It is pointed out that the gear structure 39 and the gear structure 40 are identical so that a detailed description of the construction of one of them is thought to be sufficient for the present application.

Each gear structure 39 and 40 is comprised of circular disc 41 which has a threaded opening therethrough which threadedly engages the threaded central portion of the associated shaft. Each circular disc 41 also has splines or teeth 42 formed on the circumferential edge thereof for meshing with the internal spline of a ring gear 44. It will be noted that the ring gear 44 projects axially in opposite directions beyond the disc 41 and is provided with outwardly projecting gear teeth or cogs 45 integrally formed with the central portion thereof. The cogs or gear teeth 45 of one of the gear structures is disposed in meshing relation with respect to the cogs or gear teeth of the other gear structure. It will also be noted that the teeth of gear 28 is disposed in meshing relation with the gear structure 39 so that the two gear structures are constantly being revolved or driven when the power source is energized.

Each gear structure 39 and 40 are provided with a pair of clutch means, and these clutch means are disposed on opposite sides of the circular disc of each gear structure. Each clutch means includes a sleeve type hub 46 which is disposed in concentric relation upon the associated shaft, and a sleeve bearing 47 is interposed between the shaft and the hub. Each hub has a radial flange 48 integrally formed therewith and projecting outwardly therefrom. With this arrangement, the hub members for each clutch is mounted on the associated shafts 34 and 35 to permit relative rotation between the shaft and hub members.

Each clutch means also includes a clutch driver disc 49 and a clutch driver ring 50 which are disposed in side-by-side relation and each having external splines which engage the internal splines 43 of the associated ring gear. The clutch driver disc 49 of each clutch means has a centrally located opening therethrough which is provided with internal splines which engages external splines formed on the inner axial end of the associated hub 46. With this arrangement, the clutch driver disc of each clutch is mounted on its associated hub so as to prevent relative rotation therebetween, but each clutch driver disc is capable of axial movement with respect to its associated hub. Similarly, each cluch driver ring 50 while being locked against relative rotation with respect to its associated ring gear, is capable of axial movement with respect to the ring gear. The driver disc 49 and driver ring 50 of each clutch may be considered as clutch input elements.

Each clutch means is also provided with a generally circular flat pressure plate 53 which is suitably apertured and which is positioned in concentric relation upon the hub 46. A sprocket 52 is also positioned in concentric relation upon each hub 46 and the pressure plate and sprocket associated with each hub are fixedly secured thereto for rotation therewith by suitable bolts 53 which project through apertures in the sprocket and pressure plate and through the radial flange 48 on each hub. In this regard, it will be noted that the pressure plate for each clutch means is positioned against the inner face of the radial flange 48 while the sprocket 52 is positioned against the outer face thereof. It will therefore be seen that when the pressure plate 53 is revolved, the hub 46 associated therewith will also be revolved and thereby revolve the sprocket 52. The sprocket may be considered as the output element of each clutch.

Referring again to FIG. 3, it will be noted that annular strips of clutch facing material are secured to opposite axial surfaces of the clutch driver disc 49 of each clutch means. Similarly, an annular strip of clutch facing material is also affixed to the inner face of each pressure plate 51. It will therefore be seen that when the pressure plate, clutch driver disc, and clutch driver ring are compressed into tightly interengaging relation, power will be transmitted from each ring gear to the associated sprocket 52.

Means are therefore provided for shifting each clutch means into and out of driving relation with respect to the associated ring gear. It will be seen that each bearing housing 31 has a cylindrically shaped inwardly facing recess 54 therein, each recess receiving a cylindrically shaped piston 55 therein. Each piston is provided with an inner annular groove and an outer annular groove for accommodating yieldable sealing rings which engage the cylindrical walls formed by the cylindrical recess 54 so that suitable seals are formed thereat.

The inner end of each cylindrically shaped piston 55 engages a needle bearing assembly 56 which is disposed concentrically around the associated hub 46 and which is disposed in engaging relation with respect to the sprocket 52 of the associated clutch means. It will therefore be seen that axial shifting movement of each cylindrically shaped piston 55 inwardly towards the center causes the corresponding clutch driver disc, clutch driver ring, and pressure plate to be engaged in driving relation with respect to the associated ring gear so the drive will be transmitted to the associated sprocket 52. With this arrangement, it will be seen that when each cylindrical shaped piston 55 is in a retracted position, the associated clutch means will not be engaged in driving relation with the associated ring gear. The sprocket associated with each clutch although mounted on shafts 34 and 35 will not be driven thereby. Each piston and cylindrical recess comprises a clutch shifting hydraulic ram for operating the clutches.

Each bearing housing 31 also has a passage 57 therein which communicates with the cylindrically shaped recess 54, and the passage is interconnected to the fitting on a conduit which is connected to a source of hydraulic fluid under pressure. It will be noted that the pair of hydraulic rams located adjacent one side of the housing 11 are connected by their conduits C to a control valve which is provided with a control handle H.

Figure 4:
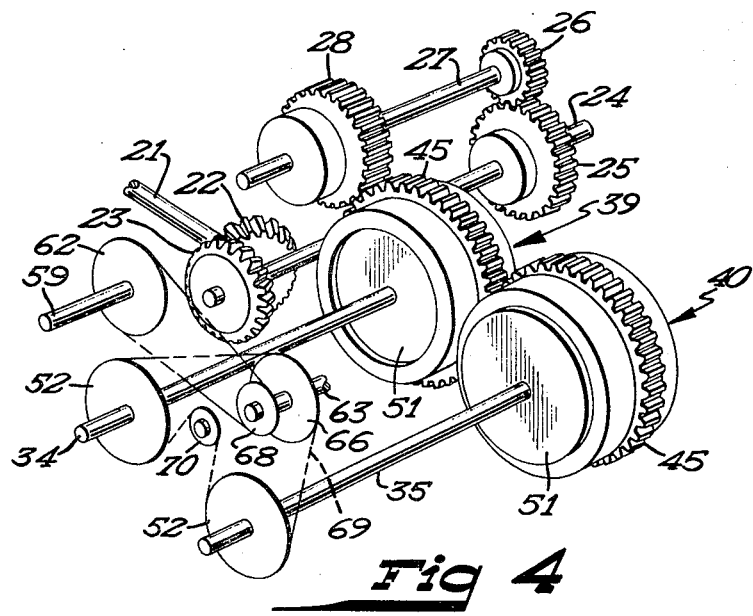
FIG. 4 is a diagrammatic perspective view illustrating the input and output drive means of the transmission device.
Figure 5:
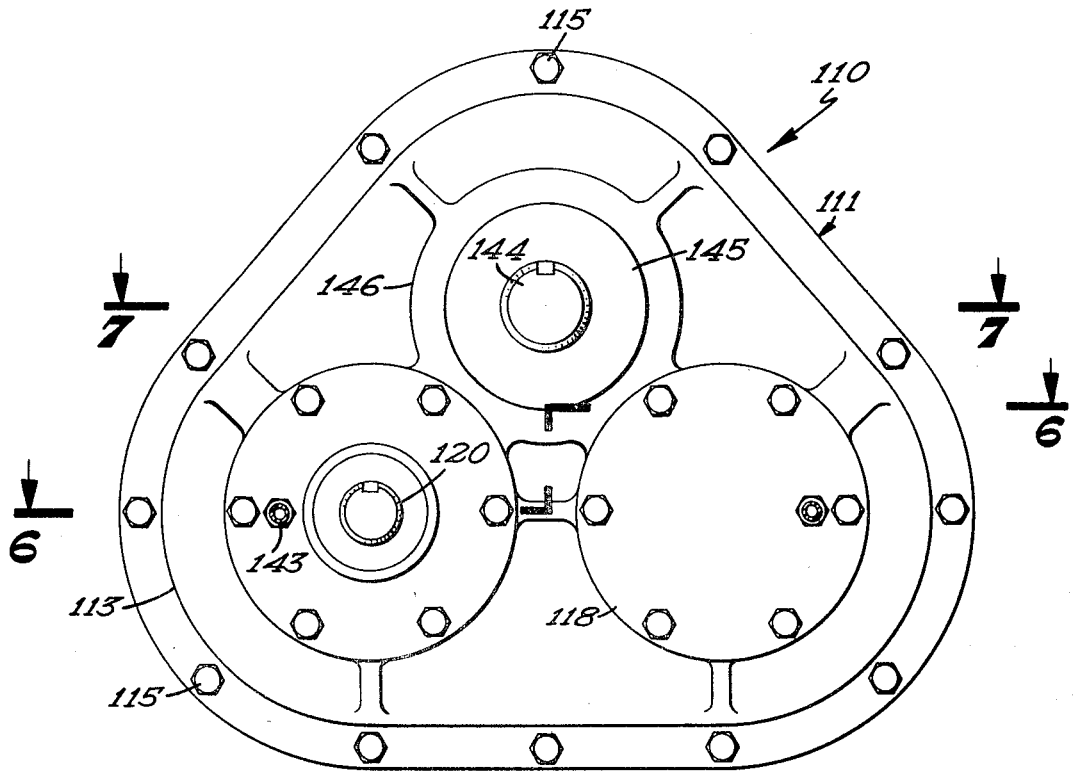
FIG. 5 is a side-elevational view of a modified form of the transmission device.
Figure 6:
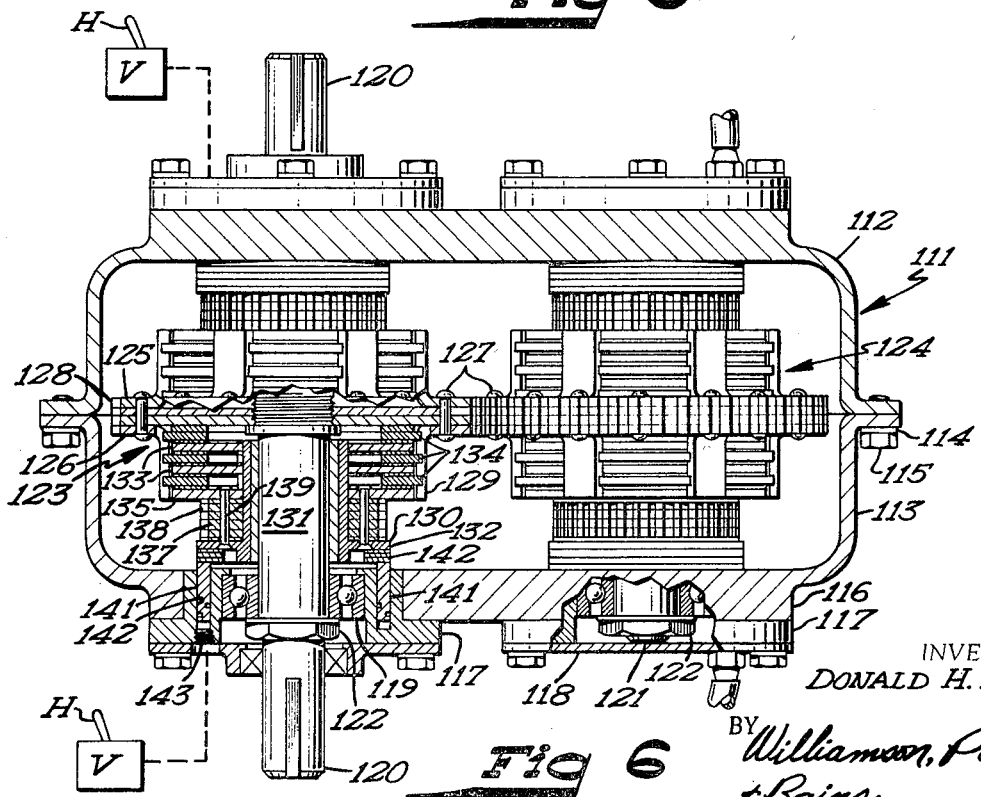
FIG. 6 is a cross-sectional view taken approximately along line 6—6 of FIG. 5 and looking in the direction of the arrows.
Figure 7:
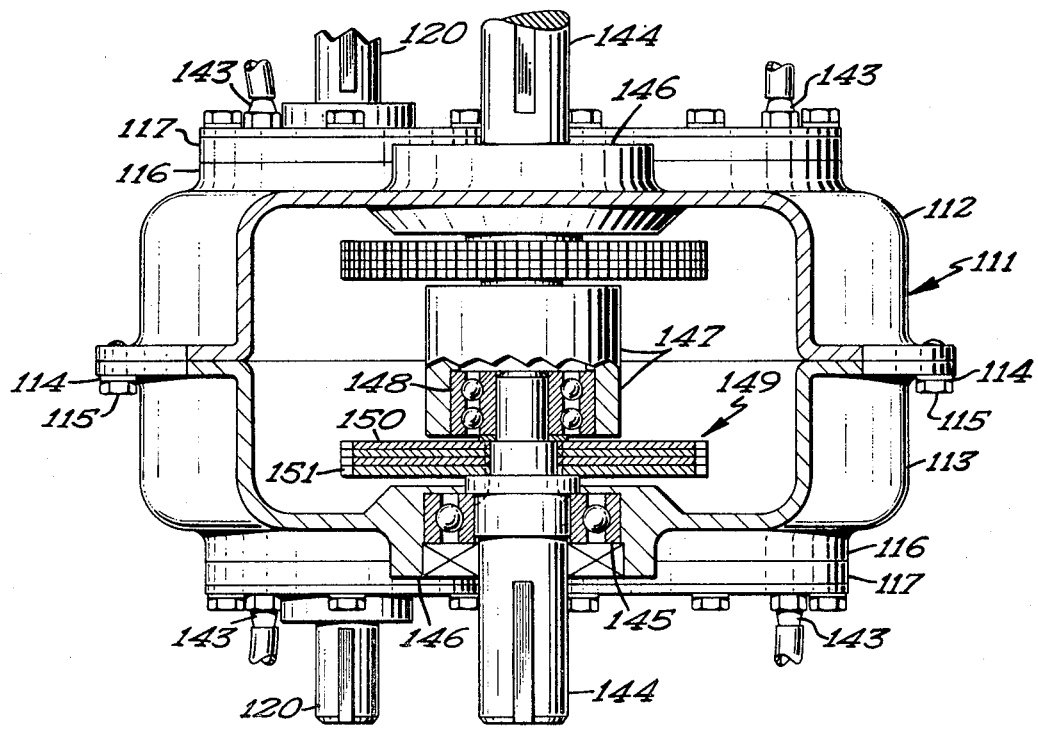
FIG. 7 is a cross-setcional view taken approximately along line 7—7 of FIG. 2 and looking in the direction of the arrows.
Figure 8:
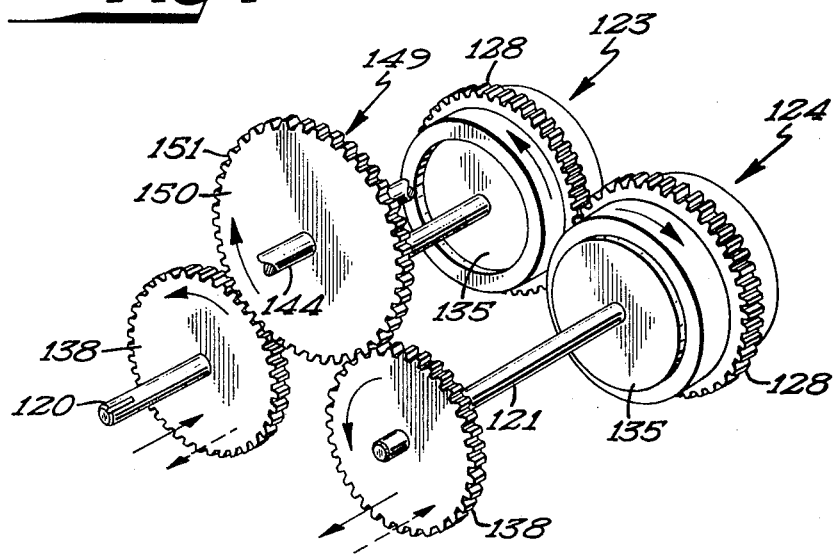
FIG. 8 is a diagrammatic perspective view illustrating the interrelation of certain elements of the embodiment of the transmission device illustrated in FIGS. 5 through 7.

Referring now to FIGS. 2, 3 and 4, it will be seen that the transmission device has a pair of output shafts projecting outwardly from opposite sides thereof. The output shafts 59 project interiorly of the housing and are revolvably supported by suitable ball bearing units 60 which are suitably mounted in cylindrically shaped bosses 61 formed in the side walls of the housing 11. It will be noted that the shafts 59 are located above the shafts 34 and 35 and each shaft 59 has a relatively large sprocket 62 secured to the inner end thereof for rotation therewith. It will further be noted that the sprockets 62 are located above and on opposite sides of the gear structure 40 and each shaft may be connected by suitable drive means to ground engaging wheels or other mechanisms which are to be driven.

A shaft 63 has opposite ends thereof journaled in bearings 64 carried by bosses 65 formed in the side plates 12 of the housing 11. The shaft 63 is disposed in substantially parallel relation and at substantially the same level as the output shafts 59. In this regard, it will be noted that the output shafts 59 in the embodiments shown, are disposed in coaxial relation with respect to each other.

The shaft 63 has a pair of relatively large substantially identical sprockets 66 journaled thereon for rotation relative thereto, suitable bearings 67 being interposed between each sprocket and the shaft 63. Each large sprocket is affixed to one of a pair of smaller sprockets 68 by a sleeve 68a, each smaller sprocket 68 is positioned closely adjacent but outwardly one of the larger sprockets 66. Suitable bearings are interposed between each sprocket 68 and 63. It will further be noted that each large sprocket 66 is disposed above but in the same vertical plane as a pair of sprockets 52. Each smaller sprocket 68 is disposed in the same vertical plane as one of the output sprockets 62.

A pair of sprockets 52 have an endless chain 69 trained thereover and over one of the large sprockets 66 which is disposed in the same vertical plane as the sprockets 52. An adjustable idler sprocket 70 is positioned between each pair of sprockets 52 and is vertically adjustable relative thereto and each endless chain 69 is trained about one of the idler sprockets 70. The idler sprocket is adjustable in the manner of the idler sprockets disclosed in my copending application, Ser. No. 698,570. An endless chain 71 is trained about each small sprocket 68 and output sprocket 62.

With this arrangement, it will be seen that each output shaft 59 will be driven by one of the sprockets 52 to which it is drivingly interconnected. Each output shaft 59 may be maintained in a neutral condition or may be selectively driven in a forward or reverse direction by selective engagement of one of the sprockets 52 with the associated ring gear.

In this regard, it is pointed out that when the piston 55 for shifting one clutch means is extended to drivingly interengage the associated sprocket 52 with its ring gear, the other of the chain connected sprockets 52 will be maintained in idling relation since its piston will be in a retracted position. Each valve for controlling each pair of hydraulic rams may be shifted between neutral, forward and reverse positions by its handle H. When either of the valves is in the forward position, the piston controlled thereby will shift the sprocket 52 into driving engagement with the gear structure 29. The other sprocket 52 will be disengaged from its gear structure 40. When in the reverse position, the sprocket 52 controlled by either valve V will be drivingly interengaged with the gear structure 40 while the other of the pair of sprockets 52 will be disengaged from the gear structure 59. The valve can also be shifted to a neutral position wherein both of the pistons controlled by one of the valves V will be in the retracted position. Therefore if the sprocket which is journaled on shaft 35 is engaged with its gear structure 40 as illustrated in FIG. 4, then the other sprocket illustrated in FIG. 4 will be disengaged from its gear structure 39. When this occurs, the output shaft 59 illustrated on the left side of FIG. 4 will be driven in a reverse direction. However, when the other sprocket 52, which is journaled on the shaft 34 is drivingly interrelated with its gear structure 39, then it will be driven so that the shaft 59 illustrated in FIG. 4 will be revolved in the forward direction.

It will be appreciated that in FIG. 4, the output shaft 59 for only one side has been illustrated along with the manner in which the output shaft is interconnected to the associated sprockets 52. The output shaft located on the opposite side will be operated in the same manner so that it may be driven either in a forward or reverse direction or may be maintained in a neutral condition. A separate control valve V is provided for controlling operation of the pistons for driving the output shaft on the opposite side from that shown in FIG. 4. Therefore two such control valves are provided for shifting the clutch means and each valve has a control handle shiftable between neutral, forward, and reverse positions.

It is pointed out that the auxiliary housing 17 and the various components therein may be removed from the opening, and the front plate 16 will be closed by a suitable closure plate and thereby eliminate the input drive gear train from the shaft 21 to the gear structure 39. The input drive to the engine may be connected directly to shaft 34 by extending the shaft outwardly beyond the side plates of the housing 11.

Referring now to FIGS. 5, 6, 7 and 8, it is seen that a modified form of the transmission device, designated generally by the reference numeral 110 is thereshown. This device 110 is comprised of a housing 111, which includes a pair of side walls or plates 112 each having inturned flanges 113 which define the continuous tranverse wall of the housing. It will be noted that the inturned flanges 113 are bent outwardly as at 114 and these outwardly bent marginal edge portions 114 are provided with threaded apertures for receiving the bolts 115 therethrough to detachably secure the side walls or plate 112 together.

Each side wall or plate 112 has a pair of outwardly projecting generally hollow bosses 16 integrally formed therewith and projecting outwardly therefrom. It will be noted that the housing 111 is of generally triangular shaped configuration when viewed in side elevation, and the pair of bosses 116 located on each side plate 112 are disposed in side by side relation. Each boss 116 has a flanged bearing housing 117 positioned therein and a suitable closure cover 118 is disposed in closing relation with respect to the bosses and is secured to the side plates by suitable bolts. Each flanged bearing housing has a roller bearing assembly 119 positioned therein and it is pointed out that the roller bearings on one side plate are disposed in coaxial alignment with a roller bearing assembly on the other side plate. One of the axially aligned pair of roller bearing assemblies 119 journal the end portions of a drive transmitting shaft 120 therein and the other aligned pair of roller bearing assemblies journal the end portions of a drive transmitting shaft 121 therein. Opposite ends of each shaft are secured in place against axial movement by nuts 122. The shaft 120 has a gear structure 123 mounted on the central portion thereof and the shaft 121 has a gear structure 124 mounted on the central portion thereof.

The gear structures are of identical construction and each includes a pair of circular discs 125 each having a threaded opening therethrough for threaded engagement with the central threaded portion of the associated shaft. Each gear structure also includes a pair of ring gears 126, each ring gear being positioned adjacent the outer surface of one of the pair of circular discs 125. Rivets 127 clamp the ring gears to the circular disc 125 so that the gear structures 123 and 124 are of laminated construction. It will be noted that the circular disc 125 and ring gears 126 of each gear structure have external teeth 128 formed therein and these teeth are disposed in engaging relation with the teeth on the other gear structure. It will also be noted that each of the ring gears 126 has a plurality of axially extending circumferentially arranged cogs 129 integrally formed therewith and projecting axially outwardly therefrom.

Each of the gear structures 123 and 124 are provided with a pair of clutch means so that drive from the gear structures may be transmitted selectively from the gear structures. In this regard, it will be noted that the shaft 120 has one end thereof which projects outwardly from the housing and is connectible by suitable drive connections to a source of power such as an engine whereby the shaft 120 actually constitutes an input shaft. Thus the gear structures are constantly driven and the pair of clutch means associated with each gear structure permits output shafts to be driven in either a forward or reverse direction or alternatively to be maintained in a neutral non-driven condition.

Each clutch means includes a sleeve type hub 130 which is disposed in concentric relation upon a sleeve bearing 131 which in turn is concentrically positioned upon the associated drive transmitting shaft. Each hub 130 has a radial flange 132 integrally formed therewith adjacent but spaced from the outer end thereof. Each clutch includes a pair of clutch driver discs 133 each having an opening therein through which the hub 130 projects. Three clutch driver rings are provided and it will be noted that the clutch driver rings are alternately disposed with respect to the pair of clutch driver discs. The clutch driver rings have external splines or teeth therein which are disposed in engaging relation with respect to the cogs 129 of the ring gear of the associated gear structure. The clutch discs 133 have internal splines which engage and mesh external splines on the associated hub 130.

Each clutch means also includes a pressure plate 135 which has an opening therein and which is positioned in concentric relation upon the associated hub 130. A laminated gear 136 is provided and is formed of a plurality of similar apertured lamina 137, each having teeth 138 in the outer circumferential surface thereof and each being disposed in concentric relation upon the associated hub 130. The laminae of the laminated gear are fixedly secured together and to the pressure plate and radial flange 132 of the associated hub 130 by suitable bolts 139. In this regard, it will be noted that the laminated gear 136 is positioned between the pressure plate and the flange 130.

Referring again to FIG. 6, it will be noted that annular strips of clutch facing material are secured to opposite axial faces of the clutch driver disc 133, while the inner annular face of the pressure plate 135 has an annular strip of clutch facing affixed thereto. It will therefore be seen that when the hub 130 of each clutch means is shifted axially inwardly, the pressure plate will urge the clutch driver disc and clutch driver rings into clamped relation with respect to each other and with respect to the circular disc 125 of the associated gear structure. Since the teeth or splines of the clutch driver rings 134 of each clutch is disposed in meshing relation with respect to the axially extending cogs 129 of the associated ring gear, drive will be transmitted to the associated laminated gear 136. Similarly the meshing splines on the clutch driver discs 133 with respect to the splines on the hub 130 permit relative axial movement between the hub and driver discs, but drive will be transmitted to the hub from the driver discs.

Means are also provided for shifting each clutch means into and out of driving relation with respect to the associated gear structure. To this end, it will be seen that each of bearing housing 117 has a cylindrically shaped inwardly opening recess 140 therein and each recess has a cylindrically shaped piston 141 positioned therein. The inner end of each piston projects outwardly therefrom and engages a needle bearing assembly 142 interposed between the end of each piston and the flange on the associated hub 130.

Thus it will be seen that as each cylindrically shaped piston is shifted axially inwardly and retracted outwardly, the associated clutch means will be shifted into and out of engaging relation with respect to the associated gear structure. It will be noted that the volumetric space defined by each cylindrically shaped recess has a passage 143 connected in communicating relation therewith and the passage is adapted to be connected to the fitting of a conduit which in turn is connected to a source of hydraulic fluid under pressure.

Again it will be noted that a single valve V will be used to operate a pair of clutch shifting rams and the valve V is provided with an operating handle H. In other words, referring to FIG. 6, a single valve V is used to operate the clutch means illustrated on the lower half of FIG. 6 and a second valve means is used to control operation of the clutch means located at the upper half of FIG. 6. As in the embodiment of FIGS. 1 through 4, each valve V is disposed in fluid controlling relation with respect to each clutch shifting means and will have three control positions for controlling the disposition of each pair of clutch means. A neutral position will permit the pair of clutch means controlled by a single valve V to be maintained out of driving relation with respect to the gear structures. Both pistons controlled by the valve V will be in a retracted position when the valve V is in the neutral position. A forward drive will engage the clutch means with the gear structure 123 while the other of the pair of clutch means will be maintained out of driving relation with respect to the gear structure 124.

Drive from the laminated gears 136 is transmitted selectively to one of a pair of output shafts 144 each being journaled in a ball bearing unit 145 which is carried by one of a pair of bosses 146. It will be noted that the output shafts 144 are disposed in coaxial alignment and project outwardly from the housing adjacent the upper portion thereof.

The inner end portions of each shaft 144 are journaled in a ball bearing unit 148 which is carried by a depending boss 147 integrally formed with and projecting downwardly from the flange 113 of the associated side plate 112. Each shaft 144 has a laminated gear 149 keyed thereto for rotation therewith and it will be noted that each gear 149 is formed of a plurality of laminates 150 suitably joined together and having teeth 151 in the outer peripheral edge thereof. The teeth on each gear 149 are disposed in meshing relation with respect to the teeth of the pair of laminated gears 136 which are positioned below and in the same vertical plane with each gear 149. Thus it will be seen that the direction that the gear 149 is revolved will be dependent upon which of the associated pair of laminated gears 136 is drivingly engaged with its associated gear structure.

Each shaft 144 may be connected to any suitable driven mechanism such as the driven tool of an agricultural implement. The transmission device 110 is of rather small compact construction and may be very nicely accommodated in any number of driven devices.

The operation of the embodiment of FIGS. 5 through 8 is similar to that of the embodiment of FIGS. 1 through 4 and the control valve operating each clutch shifting means may be operated so that the output shaft 144 may be driven in either a forward or reverse direction. Thus the shafts 144 may be simultaneously revolved in a forward direction or simultaneously revolved in a reverse direction. The shafts 144 may be simultaneously maintained in a neutral condition or each may be selectively driven in a forward or reverse direction. It will further be noted that by manipulating the valve control V for each clutch shifting means, one shaft 144 may be driven in a reverse direction while the other shaft 144 is driven in a forward direction.

In the embodiments of FIGS. 5 through 8 as well as the embodiment of FIGS. 1 through 4, the transmission device is arranged and constructed to permit instantaneous changing of the drive of the output shaft at high speeds without damage or undue stress to the various components of the transmission system. The hydraulic clutch shifting means permits the clutches associated therewith to be instantly but positively shifted between neutral and drive conditions, but the hydraulic shifting means are highly desirable not only because of their efficiency of operation but because of their simple and inexpensive construction.

It will therefore be seen that I have provided a novel transmission device which may be nicely incorporated as a drive transmitting means in any number of driven systems and is especially adaptable for use as the drive transmitting means of vehicles as well as the drive transmitting means for driven tools.

Thus it will be seen that I have provided a novel drive transmitting means which is not only of simple and inexpensive construction but one which functions in a more efficient manner than any heretofore known comparable device.

It will of course be understood that various changes may be made in the form, details, arrangement and proportions of the various parts without departing from the scope of my invention.

What I claim is:

1. A transmission system comprising
    a housing, a pair of drive transmitting shafts disposed in substantial parallel relation within said housing and journaled thereon for rotation relative thereto, one of said shafts adapted to be operatively connected with a source of power to be revolved thereby,
    a pair of output shafts in said housing, and each having one end portion thereof projecting outwardly of said housing,
    a pair of similar enmeshing gear structures each being secured to one of said shafts for rotation therewith,
    a first pair of clutches, one of which is mounted in coaxial relation on one of said drive transmitting shafts, and the other of said first pair of clutches mounted in coaxial relation on the other of said drive transmitting shafts,
    a second pair of clutches, one of which is mounted in coaxial relation on one of said drive transmitting shafts, and the other of such second pair of clutches being mounted in coaxial relation on the other of said drive transmitting shafts, each clutch including an input element and an output element, the input element of each clutch being continuously drivingly connected with one of said gear structures, means drivingly interconnecting the output elements of said first pair of clutches with one of said output shafts, means drivingly interconnecting the output elements of said second pair of clutches with the other of said output shafts, a first pair of hydraulic rams mounted within said housing and each engaging one of said of first pair of clutches for shifting the output element into and out of engaging relation with its associated input element, a second pair of hydraulic rams mounted within said housing and each engaging one of said second pair of clutches for shifting the output element into and out of engaging relation with its associated input elements, said first and second pair of hydraulic rams being connected to a source of hydraulic fluid under pressure, a pair of control mechanisms one of which controls operation of said first pair of clutches and the other of which controls operation of said second pair of clutches, each control mechanism being shiftable from a neutral position to first and second drive positions, each control mechanism when in the neutral position causing disengagement of the respective input and output elements of the pair of clutches controlled thereby, each control mechanism when shifted to the first drive position causing interengagement of the input and output elements of one clutch of the pair of clutches controlled thereby while the input and output elements of the other clutch of said pair of clutches are disengaged from each other, and each control mechanism when shifted to the second drive position causing the other clutch of the pair of clutches controlled thereby to be engaged with its gear while said one clutch is disengaged from its gear so that each output shaft may be selectively revolved in either direction and independently of the other output shaft.

2. The transmission system as defined in claim 1 wherein each of said hydraulic rams includes a structure mounted on said housing interiorly thereof and having a cylindrical recess therein, a cylindrical piston disposed within said recess and being axially shiftable relative thereto and engaging one of said clutches to shift the same into and out of engaging relation with the associated gear structure.

3. The transmission system as defined in claim 2 wherein said piston receiving recess and each piston of each of said hydraulic rams is disposed in coaxial relation with respect to one of said drive transmitting shafts.

4. The transmission system as defined in claim 1 wherein said means drivingly interconnecting the output element of said first pair of clutches with one of the output shafts comprises a chain and sprocket drive, and said means interconnecting the output elements of said second pair of clutches with the other of said output shafts comprises a chain and sprocket drive.

5. The transmission system as defined in claim 1 wherein said means interconnecting the output elements of said first pair of clutches with one of said output shafts comprises a gear train, and wherein said means interconnecting the output shafts of said second pair of clutches with the other of said output shafts comprises a gear train.

6. The transmission system as defined in claim 1 wherein each of said gears is of laminated construction and each includes a plurality of gear discs having teeth therein and fixedly connected together in side by side relation, and each including a pair of ring gears, one ring gear having axially extending circumferentially spaced apart cogs projecting axially from one end of said gear structure and the other ring gears having axially projecting circumferentially spaced apart cogs projecting axially from the other end of the gear structure, each of said clutches having clutch elements provided with radially extending teeth that interengage in meshing relation the cogs on one of said ring gears.

References Cited

UNITED STATES PATENTS

| | | | |
|---|---|---|---|
| 2,107,072 | 2/1938 | Herrington | 74—665 |
| 2,833,161 | 5/1958 | Fossati | 74—665 X |
| 2,996,934 | 8/1961 | White | 74—722 |
| 3,307,941 | 1/1962 | Baker | 74—665 X |
| 3,254,541 | 6/1966 | Schou | 74—360 |
| 3,302,485 | 2/1967 | Gerst | 74—665 |
| 3,412,631 | 11/1968 | Frost | 74—695 |
| 3,425,293 | 2/1969 | Krawczyk et al. | 74—360 |

ARTHUR McKEON, Primary Examiner

U.S. Cl. X.R.

74—360